(12) United States Patent
Gulik

(10) Patent No.: US 9,255,421 B2
(45) Date of Patent: Feb. 9, 2016

(54) SECURE SHELTER WITH TRAPEZOIDAL WALLS

(71) Applicant: Ryszard Gulik, West Palm Beach, FL (US)

(72) Inventor: Ryszard Gulik, West Palm Beach, FL (US)

( * ) Notice: Subject to any disclaimer, the term of this patent is extended or adjusted under 35 U.S.C. 154(b) by 0 days.

(21) Appl. No.: 14/099,775

(22) Filed: Dec. 6, 2013

(65) Prior Publication Data

US 2015/0159393 A1    Jun. 11, 2015

(51) Int. Cl.
*E04H 9/10*    (2006.01)
*E04H 9/14*    (2006.01)
*E04B 1/32*    (2006.01)

(52) U.S. Cl.
CPC .. *E04H 9/10* (2013.01); *E04H 9/14* (2013.01); *E04B 2001/3276* (2013.01)

(58) Field of Classification Search
CPC ...... E04H 9/10; E04H 9/14; E04B 2001/3276
USPC .................. 52/82, 79.4, 79.5, 79.9, 578, 581, 52/582.1, 582.2, 586.1, 589.1, 586.2, 52/591.1; 403/DIG. 15; 257/27
See application file for complete search history.

(56) References Cited

U.S. PATENT DOCUMENTS

| | | | | |
|---|---|---|---|---|
| 2,918,992 A * | 12/1959 | Gelsavage | | 52/81.1 |
| 3,333,376 A * | 8/1967 | Marsters | | 52/82 |
| 3,763,608 A * | 10/1973 | Chamlee | | 52/81.4 |
| 3,835,602 A * | 9/1974 | Tuuri | | 52/82 |
| 4,121,540 A * | 10/1978 | Beebe | | 119/307 |
| 4,173,855 A * | 11/1979 | Raptoplous | | 52/82 |
| 4,359,842 A * | 11/1982 | Hooker | | 52/18 |
| 4,498,802 A * | 2/1985 | Del Tufo et al. | | 403/300 |
| 4,663,898 A * | 5/1987 | Yacaboni | | 52/82 |
| 4,672,779 A * | 6/1987 | Boyd | | 52/79.4 |
| 4,784,172 A * | 11/1988 | Yacaboni | | 135/87 |
| 4,850,160 A * | 7/1989 | Mullin, Jr. | | 52/82 |
| 5,369,920 A * | 12/1994 | Taylor | | 52/79.1 |
| 5,377,460 A * | 1/1995 | Hicks | | 52/81.1 |
| 5,501,046 A * | 3/1996 | Hattingh et al. | | 52/266 |
| 5,513,471 A * | 5/1996 | Worms et al. | | 52/82 |
| 5,540,014 A * | 7/1996 | Smith | | 52/81.1 |
| 5,555,681 A * | 9/1996 | Cawthon | | 52/63 |
| 5,596,844 A * | 1/1997 | Kalinowski | | 52/79.5 |
| 5,896,709 A * | 4/1999 | Pope | | 52/90.1 |
| 5,916,096 A * | 6/1999 | Wiesmann et al. | | 52/63 |
| 6,151,841 A * | 11/2000 | Green | | E04H 9/14 109/1 S |
| 6,173,547 B1 * | 1/2001 | Lipson | | 52/582.1 |
| 6,874,285 B2 * | 4/2005 | Wilson | | 52/80.1 |
| 7,290,378 B2 * | 11/2007 | Kalnay | | 52/641 |
| 7,325,364 B2 * | 2/2008 | Leininger | | A01M 31/025 43/1 |
| 7,600,348 B1 * | 10/2009 | Kostka | | 52/63 |
| 8,276,327 B1 * | 10/2012 | Pellegrene et al. | | 52/125.2 |
| 8,381,454 B1 * | 2/2013 | Robinson | | 52/79.5 |

(Continued)

*Primary Examiner* — Joshua J Michener
*Assistant Examiner* — Alp Akbasli
(74) *Attorney, Agent, or Firm* — Chen-Chi Lin

(57) ABSTRACT

An above-ground secure shelter comprise multiple modular walls of trapezoidal shape allowing dimensional variation of structure size, supported on base beams placed and anchored into the ground in the pattern defined by the shape of polygon chosen for the floor, a door with locking mechanism remaining securely closed from inside during a storm event and preventing lock-out when shelter is not in use, a multitude of structural inserts and plates connectively placed between adjacent walls, and a roof affixed thereto, resulting in a cost-effective portable shelter in the shape of polygonal pyramid frustum for use during inclement weather and/or during armed assault alike.

13 Claims, 6 Drawing Sheets

(56) References Cited

U.S. PATENT DOCUMENTS

| | | | |
|---|---|---|---|
| 8,429,858 B1* | 4/2013 | Robinson et al. | 52/79.5 |
| 8,596,451 B2* | 12/2013 | Merritt | 206/223 |
| 2001/0005967 A1* | 7/2001 | Meguro et al. | 52/653.1 |
| 2002/0083654 A1* | 7/2002 | Bini | 52/66 |
| 2005/0284074 A1* | 12/2005 | Armstrong | 52/588.1 |
| 2007/0011960 A1* | 1/2007 | Richardson | E04B 7/063 52/200 |
| 2007/0094963 A1* | 5/2007 | McDonald et al. | 52/270 |
| 2007/0151170 A1* | 7/2007 | Carter | 52/81.1 |
| 2009/0272043 A1* | 11/2009 | Zwern | E04B 1/34321 52/27 |
| 2009/0313925 A1* | 12/2009 | Lyons | E04H 1/1205 52/274 |
| 2012/0204496 A1* | 8/2012 | McSweeney | 52/80.1 |

* cited by examiner

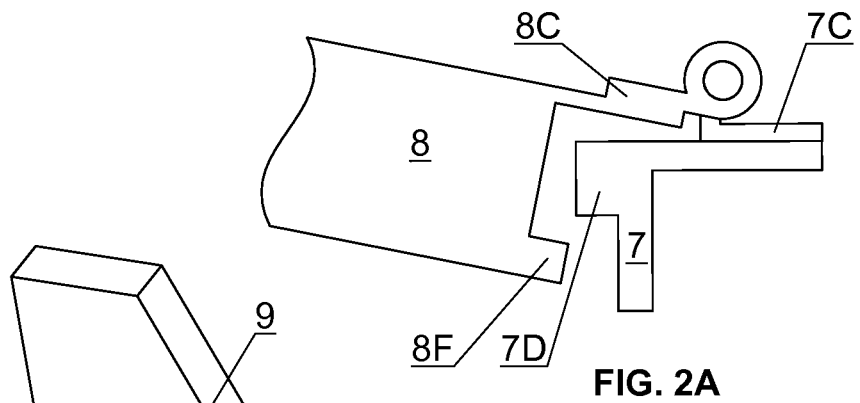
FIG. 2A
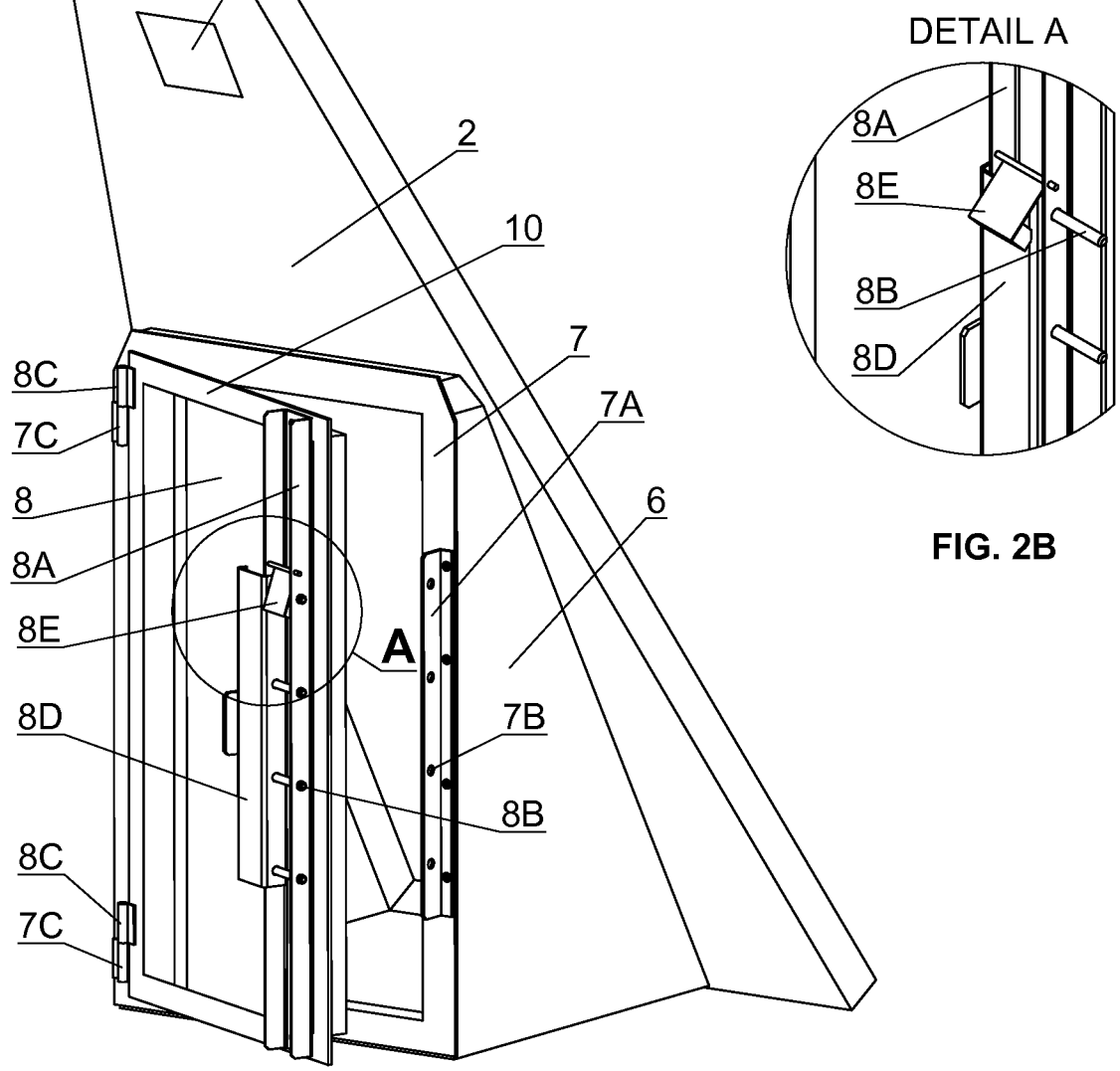
FIG. 2B
FIG. 2

DETAIL B

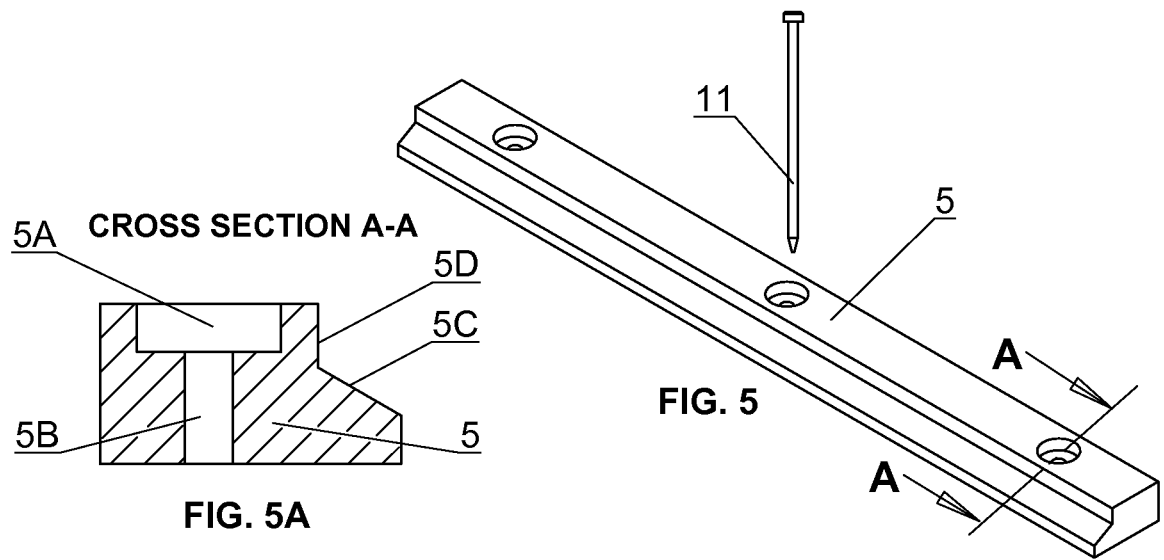
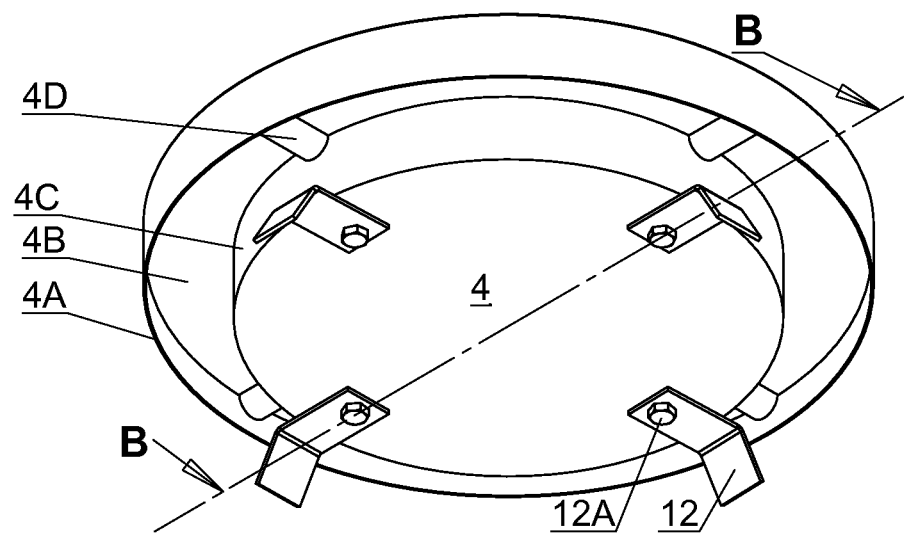
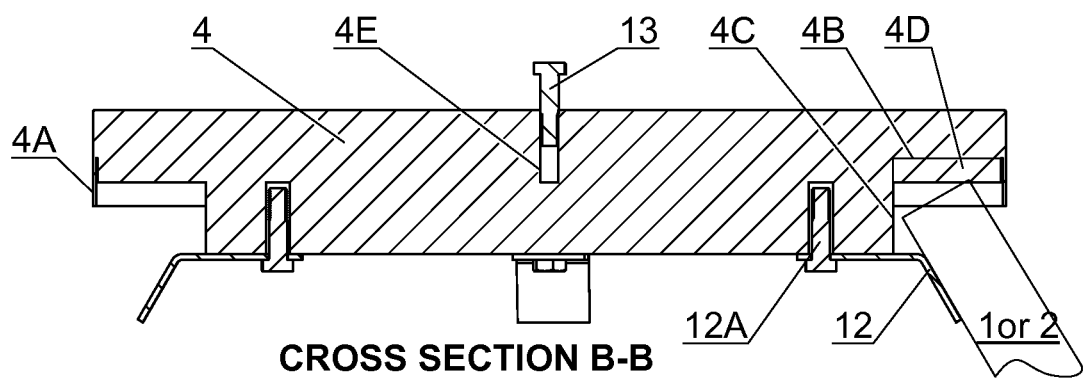

SECURE SHELTER WITH TRAPEZOIDAL WALLS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

The disclosure generally relates to the shelter and more specifically to the portable shelter for use in distressed situation during inclement weather and/or armed assault.

2. Description of Related Art

Shelters built as part of a house structure or placed in basement as in Bishop 2007—U.S. Pat. No. 7,237,362 B1. The problem with this approach is that occupants of such structure became trapped inside the destroyed house. The other problem is that incorporating shelter in an existing structure is costly and requires specialized service to do it. Yet another problem is that houses mostly affected by hurricanes do not have basements.

In other approach self-contained structures are build for underground placement as in Poole 1999—U.S. Pat. No. 5,953,866. The problem with such approach is digging a hole in the ground for placement of the structure where not every location permits this operation due to rocky base or high level of groundwater. In addition, a shelter buried for some time in the ground often become unworthy of relocation.

Yet another approach was to construct aboveground shelters from modular elements as in Horlander 2008—U.S. Pat. No. 7,458,305 B1. The problem with such approach is that modules are assembled with use of steel parts, which increase the cost, and while left exposed to elements over time weaken the security of structure. The other problem with aboveground modular shelters is that vertical walls of rectangular shapes, are affected by inclement elements similarly to house walls.

Another approach is to use conical shape apparatus made predominantly of steel as in Trochan publication US2013/0125478 A1. The problem with this approach is high cost of manufacturing, complicated machining, and protecting relatively small number of occupants.

Yet another approach is to use portable or personal shelter in the form of half-pipe, dome, or polyhedral prism made of sheet metal or plastic as in Arnold 2002—U.S. Pat. No. 6,334,278 B1. The problem with this approach is that it is either not strong enough to protect occupant from falling debris or is not comfortable to hide from the storm for prolonged period, and does not protect in the event of armed assault.

Therefore, it is apparent that there is a need for a shelter, which is cost-effective and easy to manufacture, store, transport, install, and relocate, and can efficiently protect multiple occupants during storm, hurricane or armed assault.

BRIEF SUMMARY OF THE INVENTION

The present apparatus and methods described here in preferred embodiment meet the recognized need for a secure shelter, and provide transportable, modular structure for use in unfavorable situations like inclement weather and/or during armed assault. Trapezoidal walls assembled together form resulted shape of pyramid frustum. The apparatus has preferably base section, wall section, and the top. The base section comprise of beams anchored to the ground by stakes is placed on the ground in preordained configuration, and defines the shape and perimeter of the floor. The shelter in preferred embodiment described here comprise of eight walls assembled on the base beams laid on the ground in the octagonal shape. It will be recognized by those familiar with the art, that the base may have any number of beams and therefore number of walls. Lengths of the base beams and dimensions of the panels are limited by the size of application, and the associated structural strength of wall elements designed for anticipated conditions. The shelter is crowned by the top panel that provides the roof for the structure.

Wall panels of trapezoidal shape in preferable embodiment are manufactured by pouring concrete mix into forming apparatus placed on flat smooth surface. Each modular part of the structure in preferred embodiment, contains rebar core embedded inside and represents structural properties of high strength concrete beams. At least one wall panel has an opening for a door hatch with walls of similar strength to the wall panel's. Glass blocks, preferably matching the wall panel thickness, are embedded at the narrower upper part of the walls and let light inside assembled shelter. In other preferable embodiment, glass blocks are replaced by secure shutters. Longitudinal connecting beams are placed between each adjacent pair of wall panels along the joints providing walls filament, and are held in place by the rectangular steel plates and fasteners from inside the shelter. In preferred shape of the shelter embodiment as the pyramid frustum, magnitude of outside forces resulted from the wind, flying debris or missiles, is reduced depending of angular relation of the structure elements, as it is known for those familiar with the art. In exemplary embodiment of disclosed apparatus, each wall is placed at 60 degrees with the ground in lean-in position. The alternative wall panels can be made from preferable strong material, as long as they retain trapezoidal shape with rectangular cross section, to represent all advantages of the polygonal pyramid frustum.

The door body and door hatch are manufactured employing the same method as shelter's walls to assure uniform safety of the structure. Doorjamb being a part of the hatch is placed at inner opening to receive a door. Door assembly is mounted on hinges provided in the doorjamb opening, and comprises of metal frame with hinges matching the doorjamb hinges, doorplate, and locking bolt mechanism with security device preventing lockout while shelter is not populated. Door locking mechanism may be closed only from inside the shelter securing uninterrupted ingress during emergency.

The body of the top panel comprises two parts, upper with fringe encompassing and covering the upper parts of the wall panels assembly, and lower extending downward inside the shelter space, providing the support for upper parts of the walls leaning on it. Upper cylindrical part of top panel is acting as a roof of the shelter. Fringe extending downward from top cylindrical upper body over the outside upper planar faces of the wall panels covers venting space between cylindrical face of the fringe body and the flat faces of the wall panels. Threaded insert at the center of the top planar face of the upper body is provided for lifting the top. Threaded inserts at the bottom planar face of the top's lower body, inside the secure space of the shelter, are provided for mounting steel brackets to prevent roof being lifted by external outside forces or malicious action by foe.

Pattern of roof shingles scored on upper outside planar face of wall panels on one side in preferable embodiment, while painted accordingly, makes shelter appearance more pleasant, and better blending with environment.

Preferable exemplary embodiment of secure shelter with wall panels disclosed herein made of concrete, due to the manageable size and weight, can be transported from factory to destination site already assembled, and placed as a unit on the base beams laid-down earlier on the ground in predefined pattern.

The disclosed embodiment of the shelter provide safe space to accommodate eight people during hurricane as recommended by FEMA 453/May 2006 publication titled "Safe Rooms and Shelters".

BRIEF DESCRIPTION OF THE DRAWINGS

Descriptions of the drawings for the present exemplary secure shelter embodiment, provide consistent reference with numerals denoting similar elements throughout, including cross sections, and perspective views of fragments.

FIG. 2 is a perspective view of the wall panel with the door hatch and door in open position with mechanism in preferred embodiment;

FIG. 2A is a schematic partial top view of door at the hinge side to show passive lock concept, and it is included for illustration purposes only;

FIG. 2B is a detail A of the locking mechanism in closed position;

FIG. 5 is a perspective view of the exemplary singular base beam assembly;

FIG. 5A is a cross section A-A of the exemplary base beam;

FIG. 6 is a perspective bottom view of the top's assembly;

FIG. 6A is a cross section B-B of the top's assembly with structural parts;

Figure 1:
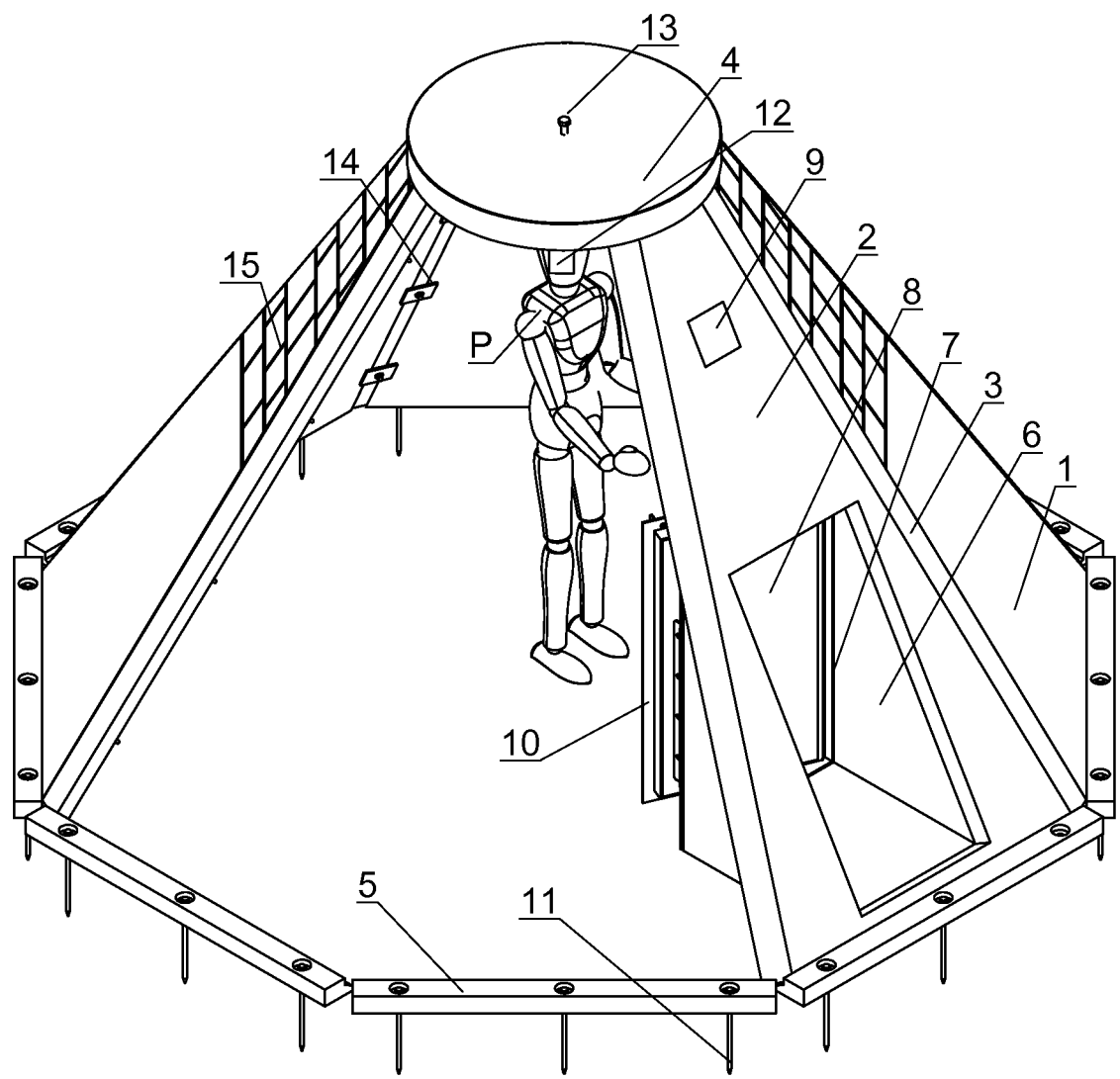
FIG. 1 is a perspective view of the secure shelter with two side walls removed to show inner works of the structure, and the relative space inside.

Drawings are provided solely for the purpose of illustration and they are not intended to limit disclosure to any or all of the exact details of the construction shown, except being essential to explain structural functionality and claimed disclosure.

DETAILED DESCRIPTION

Use of actual terminology to describe exemplary and preferable embodiment of the present disclosure as illustrated in FIGS. 1-8, is not intended to exclude any, or other technical terminology or limit processes, or shapes, to describe similar products which may lead to the accomplishment of similar function, and is limited only by the listed claims.

Characteristics of all wall panels are identical throughout the body of text in description of preferable embodiment in the present disclosure, and all are denoted with number 1, while number 2 differentiate one wall panel 1 with door hatch attached. Wall panels denoted with numbers 17 and 18 disclosed in FIG. 8 uniformly represent the same structural characteristics of all remaining wall panels, and only dimensionally are different to walls 1.

Referring to FIG. 1, example embodiment of secure shelter in perspective view with partially open door consists of plurality of trapezoidal walls 1 with one wall 2 with hatch 6 with the assembly of the door 8 placed on hinges attached to the door jamb 7 being a part of the door hatch. Door 8 encased within the doorframe 10 allows ingress and egress. Each wall panel 1, including wall panel 2, is positioned and supported at the bottom by the base beam 5 placed on the ground and anchored in pre-destined position by spikes 11. Longitudinal connecting beams 3 placed between each pair of walls 1, including wall panel 2, conform to the shape of the adjacent walls, fill the angular space between edges of the walls, and allow to connect walls 1 including 2, into one assembly, and also assure sidewise support for the wall panels. Plates 14 attached from inside of the shelter prevent walls 1 and longitudinal connecting beams being pulled-out from the secure shelter structure. Every wall panel 1 including 2 may have embedded glass block inserts 9, which let light inside the shelter without compromising a safety of the structure. In preferable embodiment, the upper outside parts of walls have scored pattern of grooves 15 to imitate house roof by applying preferable color, while the lower, and not scored parts of the walls, may be coated with different preferable color, to make the structure better blending into a surrounding environment. Walls in the preferred embodiment, being reversible, can be placed in the structure either way, therefore the other side of walls without scored pattern facing now outside, like wall 2 on the FIG. 1, may be coated in camouflage pattern to blend into different surroundings. Cylindrical top 4 functioning as the roof, has an insert 13 in its outside planar face to attach lifting device to hold the top 4 in desired position during assembly process. For security reason insert 13 may be plugged at commencement of the shelter erection. Lower part of the top 4, extended down and inward the shelter space, provides support for upper parts of all wall panels 1 and 2, and allows to secure top 4 with the shelter structure to prevent the top being pulled-up. 5 feet 10 inches high mannequin P illustrates practical utilization of the shelter space.

FIGS. 2, 2A and 2B show details of the door hatch 6, doorjamb 7, and the door assembly 8 with its locking mechanism disclosed in preferred embodiment that for those familiar with the art is the exemplary in nature and may be formulated in any other conceivable embodiment. Turning now to FIG. 2, doorjamb 7, being an integral part of the hatch 6, has two hinges 7C, attached one at the top and the other at the bottom, and at the opposite side of the opening, the locking bar 7A having number of openings 7B to receive lug-bolts of the door locking mechanism. FIG. 2A illustrates passive lock of the hinge side of the door in open position. Passive locking device consisting of longitudinal rectangular element 7D, being the integral part of the door jamb 7, and similar longitudinal rectangular element 8F, being the integral part of the frame 10 of the door 8, by interacting while door is closed, secures the door 8 in safe closed position, even after hinges are damaged by outside impact. Operation of the active locking mechanism illustrates FIG. 2 and detail A on FIG. 2B. Fixed guide 8A and shorter part 8D made of steel in the u-shape with matching perforations provided along the side legs, have identical shapes, but different body length, and are facing each other in the way, where one leg of either shape is placed between both legs of the opposite shape. Lug-bolts 8B inserted into aligned holes of both parts are then permanently attached to outside leg of shorter part 8D, and while fixed with one part, provide secure and moveable connection of both parts through the lug-bolts placed in the perforations of the part 8A, and working as a guides for sliding part 8D. Changing relative position of both parts 8A and 8D causes contracting and expanding the reach of the lug-bolts 8B from the body of part 8A for a distance traveled by shorter part 8D. Placing part 8A connectively with the inner face of the door 8, with the lug-bolts aligned with the openings 7B of the locking bar 7A, commences the assembly of the locking mechanism.

Locking mechanism of the door 8 disclosed in FIG. 2 is equipped with drop-lock 8E in preferable exemplary embodiment in the form of hinged plate with elongated weight attached along the edge opposite to the pivot, as illustrated with door in open position. Detail A in FIG. 2B illustrates locking mechanism with door in locked position. Drop-lock 8E on FIG. 2, and detail A in FIG. 2B, is working on principle of gravity, and occupies the space between outside leg of guide 8A and inner leg of locking bar 8D. The drop-lock 8E always rests on the top of the locking bar 8D, forced by gravity to fall into space created between outside leg of part 8A and inner leg of locking bar 8D, whenever locking bar 8D is retracted into door open position, and thus preventing lockout. Drop-lock 8E cannot remain in neutral and vertical position, which is achieved by placing the plate's pivot in vertical misalignment with the plate's center of gravity. To lock the door, the drop-lock 8E has to be lifted-up, and that can be done only from inside the secure shelter. Such provided feature assures ingress in emergency situation, always leaving door 8 unlocked even while the door 8 is physically closed.

Figure 3:
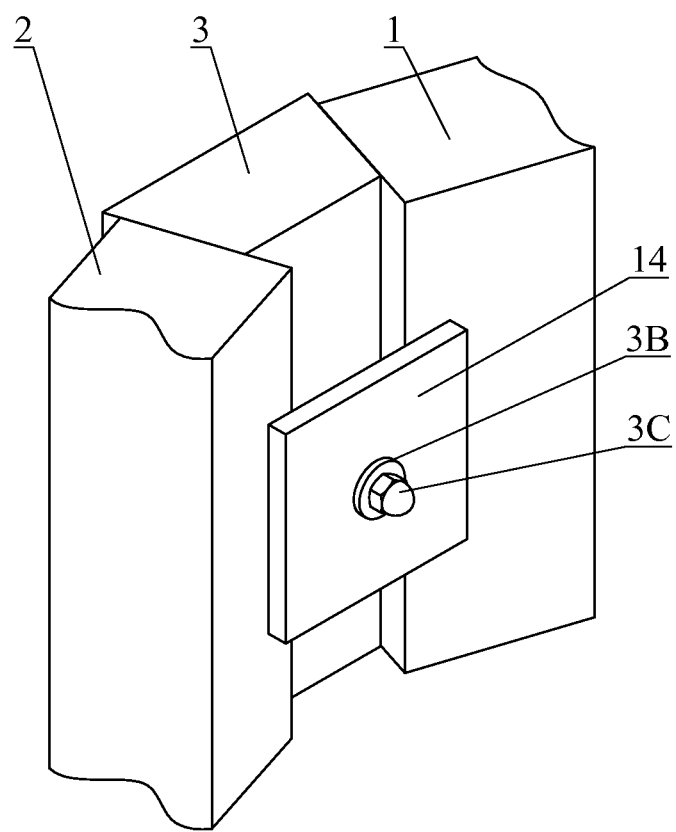
FIG. 3 is a schematic perspective partial view of the walls that have rectangular cross section in the preferable embodiment of the shelter, assembled together using longitudinal connecting beams.

FIG. 3 illustrates function of the connecting element 3 for disclosed exemplary embodiment of the wall panels, all having trapezoidal shape. For connecting a trapezoidal walls having rectangular cross section, longitudinal connecting beam confirming to the angular relation between the sidewalls of adjacent panels is illustrated in FIG. 3. In the wall panels disclosed herein, plates 14 support adjacent wall panels 1 and 2 from inside of the secure shelter. Rigidity and strength of the whole structure is acquired in the final stage of shelter assembly by tightening nuts 3C of the plates 14.

Figure 4:
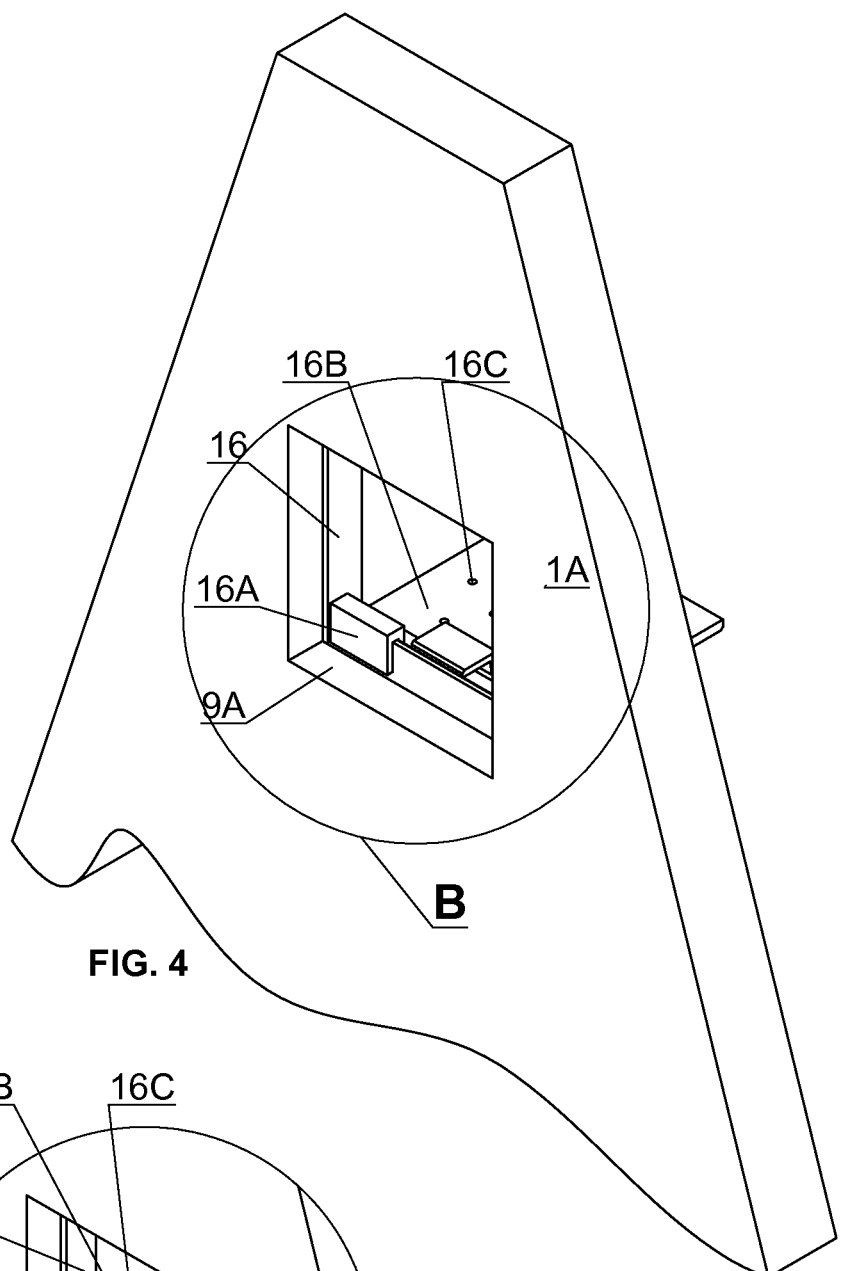
FIG. 4 is a perspective view of the upper part of the wall with the shutter opened.
Figure 4A:
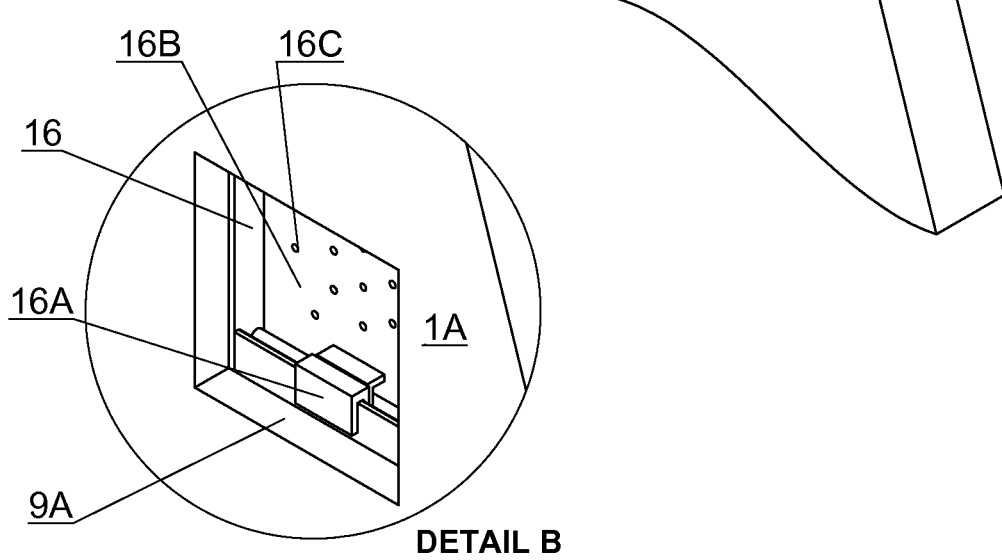
FIG. 4A is a detail view B of the upper part of the wall with the shutter closed.

FIGS. 4 and 4A disclose alternative exemplary embodiment of the wall's upper part with armored shutter 16 replacing glass block 9 in the wall panel in FIGS. 1 and 2. FIG. 4 illustrates open shutter, and FIG. 4A in detail B—the closed shutter. Disclosed in FIG. 4 exemplary embodiment of the shutter 16 comprises of frame 9A embedded in the opening 9, shutter plate 16B with perforations 16C, and locking element 16A placed in far left side in the opening. Plate 16B in upright position, stays safely closed when locking element 16A, being activated only from inside the shelter, is moved from far side to the center of the opening. Perforation 16C of the plate 16B provides secure visual contact with outside environment, while shutter plate 16B in open position provides support for defender's firearm.

FIGS. 5 and 5A disclose embodiment of the base beam 5, where FIG. 5A is a cross section A-A of the base beam 5 depicted in FIG. 5. The length of the base beam 5 is equal to the length of the bottom edge of each and every wall panel 1 and 2, and their number depends of the quantity of walls in that structure. Embodiment of the exemplary structure of the secure shelter disclosed herein in FIG. 1 contains eight base beams 5, each secured to the ground by stakes 11, and referring to FIG. 5A, drawn through the provided openings 5B with the tops of the stakes 11 fitting in the space 5A for security reason. Angular face 5C of the base beam 5 provides flat support and an exact placement of the lower part of the wall panels around the floor's area perimeter. The angle of the slope is tied with the angular tilt of wall panel. The panel's tilt of 60 angular degrees to the ground, in disclosed preferred embodiment, requires the slope of the angular face 5C of 30 angular degrees. Vertical wall 5D prevents wall panel from slipping off the base beam laid in the predefined shape of the floor and eventual collapsing of the structure.

FIGS. 6 and 6A illustrate the shape and method of connecting the top 4 with the wall panels 1 and 2, where FIG. 6 provides perspective view from the bottom, and FIG. 6A discloses cross section B-B of the top 4 in exemplary embodiment. Fastener 13, placed in the threaded insert embedded in upper planar face of top 4, allows to connect a lifting device to move, hold, and keep top 4 in desired position during initial stage of the assembly process. Number of angular brackets 12 are attached to the bottom planar face of the top 4 using the fasteners 12A disclosed in FIG. 6A. Face 4C, extended downward remains in contact with top inner edge of each wall panel 1 and 2, providing horizontal support for the wall panels 1 and 2 in tilted position during, and after assembly. Planar face 4B covers the top edges of the walls in the assembly, and takes function of the roof. Fringe 4A encompasses all upper outside planar faces of wall panels in the assembly. The ridges 4D placed concentrically on the face 4B, aligned with the inserts 12A, separate the top edges of the walls and the face 4B assuring circulation of the air as illustrated by the side sketch of interacting walls "1 or 2" in FIG. 6A. Angular bracket 12, having two planar faces of which one is attached by fastener 12A to the bottom planar face of the top 4, and the other face being tightly placed against the wall, and being parallel to the planar face of the wall panel 1 and 2, is acting as an anchor for the top 4. Exemplary assembly of the top 4 shows four angular brackets, but their quantity may vary as required by the application.

Figure 7:
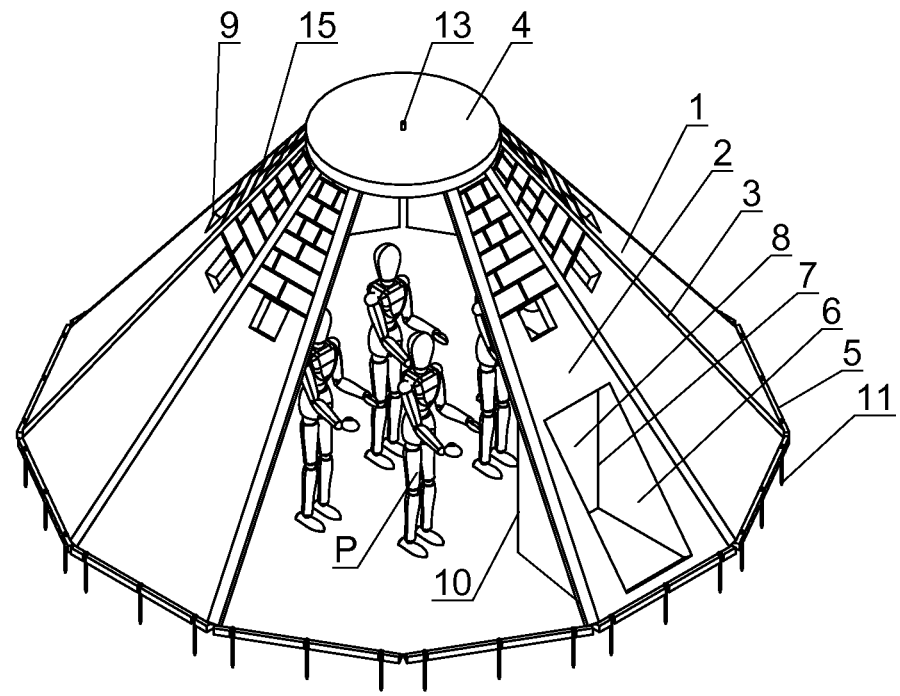
FIG. 7 is a perspective view of the exemplary secure community shelter with dodecagonal shape of the floor.

FIG. 7 is a perspective view of the secure hurricane shelter with dodecagonal shape of the floor, which provides space for more than 40 occupants (following FEMA recommendations) and may be used for protection of small community. All elements used to construe earlier described octagonal structure follow the rules of angular dependency in governing method of building polygonal pyramid frustum, known to those familiar with the art.

Figure 8:
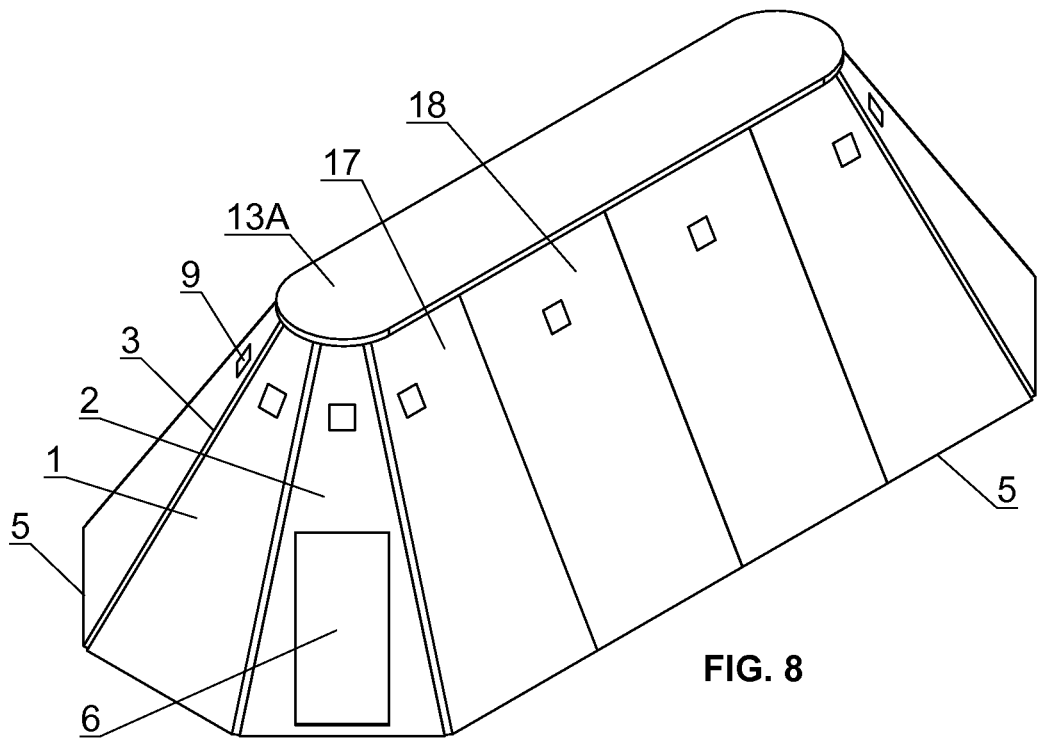
FIG. 8 is a perspective view of the exemplary secure community shelter expanded with side walls inserts.

FIG. 8 is a perspective view of the exemplary secure hurricane shelter disclosed in FIG. 7 in elongated form. Such construed the secure shelter comprise of two incomplete pyramid frustums placed in a distance and joined together by wall elements 17 and 18 leaning in prevailing angle and having matched base beams 5 placed at the bottoms of each walls 17 and 18. The shelter with enlarged capacity requires minimum four transitional wall panels 17 in the shape of the right angle trapezoid and elective even number of rectangular wall panels 18 placed between the right angle trapezoidal wall panels 17. Top panel 13A has to match the shape of the open space at the top of wall panels. Longitudinal connecting beams are used between all trapezoidal walls the same way as in disclosed earlier exemplary octagonal structure. The seams between right angle trapezoidal wall panels 17 and rectangular wall panels 18 require only to be sealed, the same way as the seams between two rectangular wall panels 18.

Assembly of the secure shelter in selected location on flat ground begins from placing supporting beams 5 in predefined polygonal shape, which is an octagon in preferable embodiment of the disclosed herein structure. Beams 5 are secured in predestined positions the ground by spikes 11 drawn through provided holes in the base beams 5. The first panel to begin erection of the wall assembly is wall panel 2 with attached hatch 6 placed on the floor against the base beam 5 destined for door location inside the perimeter of the floor of the shelter. The flat bottom of the hatch 6 is placed on the ground, therefore the weight and the shape of the hatch keeps wall panel 2 in tilted position. The next preferably erected wall panel 1 is set on the base beam 5 which is in the proximity of base beam 5 of wall 2 on either side. Longitudinal connecting beam 3 placed between wall 2 and wall 1, and secured by plates 14 cause the erected structure to be self-supported due to the resulted geometry of the triangular base, where center of gravity for the such assembly falls inside the perimeter of the base. For safety purposes adjustable angular shoring brace should be placed at the inner side of the wall 1. The erection of next wall panel 1 on the other side of the wall 2 is carried the same way as the previous wall 1 and therefore assures the balance of the structure. After erecting five walls, and four longitudinal connecting beams 3, the top 4 is lifted and placed on upper edges of the already erected wall panels 1 including wall panel 2. Erection of the remaining three walls 1 and four longitudinal connecting beams 3 continues the same way as before. Final tightening of all fasteners for the connecting plates 14 assures rigidity and strength of the secure shelter assembly. Fastening angular plates 12 at the bottom face of the top 4 secures position of the roof with walls 1 and 2 of the structure in preferred embodiment.

Last step in secure shelter installation is to place the door 7 in the door opening of the hatch 6.

What is claimed is:

1. A secure shelter in a shape of polygonal pyramid frustum, the polygonal pyramid frustum having an internal space, the internal space having a centroid point, the secure shelter comprising:
   a plurality of base beams adapted to be anchored to the ground, the plurality of base beams each being placed on a respective side of a polygon;
   a plurality of wall panels of a trapezoidal shape, wherein each of the plurality of wall panels has a lower side and an upper side parallel to the lower side; wherein a width of the lower side is larger than a width of the upper side; wherein the lower side is connected to the plurality of base beams; wherein the upper side is leaning toward the centroid point of the internal space; wherein each of the plurality of wall panels is inclined at an angle from the ground; and wherein a selected wall panel of the plurality of wall panels has a door opening to receive a door assembly;
   a plurality of wedge shaped elements, wherein each of the plurality of wedge shaped elements is connected to a respective left side of wall panel of the plurality of wall panels and a respective right side of wall panel of the plurality of wall panels;
   fasteners and plates to hold the plurality of wall panels and the plurality of wedge shaped elements, wherein each of the plurality of wall panels has an inner surface near the centroid point of the internal space and an outer surface away from the centroid point of the internal space; and wherein the fasteners and the plates each are closer to the respective inner surface than the respective outer surface; and
   a roof.

2. The secure shelter of claim 1, wherein a number of the plurality of base beams is equivalent to the number of the plurality of wall panels.

3. The secure shelter of claim 1, wherein the plurality of base beams are symmetric to the centroid point of the internal space.

4. The secure shelter of claim 1, wherein each of the plurality of wall panels has a block opening to receive a glass block or a steel plate shutter.

5. The secure shelter of claim 4, wherein the steel plate shutter is operable by a lateral locking apparatus; wherein the steel plate shutter is characterized by an open and a closed positions; wherein the steel plate shutter has perforations to allow visual contact at the closed position; wherein each of the plurality of wall panels has an inner surface near the centroid point of the internal space and an outer surface away from the centroid point of the internal space; and wherein the lateral locking apparatus is accessible to a user standing closer to the respective inner surface than the respective outer surface.

6. The secure shelter of claim 1, wherein the door assembly has a drop-lock, a hatch and a door panel.

7. The secure shelter of claim 6, wherein the drop-lock is hingedly rotatable about a horizontal axis; wherein a center of gravity of the drop-lock is misaligned with the horizontal axis; wherein the drop-lock is characterized by a balanced and an unbalanced positions; wherein the door panel is characterized by an open and a closed positions; wherein the selected wall panel has an inner surface near the centroid point of the internal space and an outer surface away from the centroid point of the internal space; wherein the drop-lock is closer to the inner surface than the outer surface; and wherein the drop-lock is at the balanced position and the door panel is at the open position until a user standing closer to the inner surface than the outer surface lifts the drop-lock to the unbalanced position and closes the door panel.

8. The secure shelter of claim 1, wherein the roof has:
   a metal apron of a circular shape; wherein each of the plurality of wall panels has an inner surface near the centroid point of the internal space and an outer surface away from the centroid point of the internal space; and wherein the metal apron continuously covers a respective upper portion of the respective outer surface of each of the plurality of wall panels.

9. The secure shelter of claim 8, wherein the roof has a lower portion extending downward to support the plurality of the wall panels.

10. The secure shelter of claim 9, wherein
    a plurality of threaded inserts are embedded in the lower portion of the roof; and wherein
    a plurality of plates connect the roof to the plurality of wall panels.

11. The secure shelter of claim 1, wherein the plurality of wall panels are of an isosceles trapezoidal shape, and wherein the secure shelter further comprises four right trapezoidal transitional wall panels and a plurality of even number of rectangular wall panels.

12. The secure shelter of claim 1, wherein the angle is sixty degrees.

13. The secure shelter of claim 1, wherein the roof is parallel to the polygon and wherein an area of the polygon is larger than a top surface area of the roof.

* * * * *